– Patent Number: 4,705,663
Date of Patent: Nov. 10, 1987

United States Patent [19]
Steven et al.

[54] NUCLEAR REACTOR FUEL ELEMENT

[75] Inventors: Josef Steven, Neunkirchen/Brand; Karl Hassfurther, Bamberg, both of Fed. Rep. of Germany

[73] Assignee: Kraftwerk Union Aktiengesellschaft, Mülheim/Ruhr, Fed. Rep. of Germany

[21] Appl. No.: 801,140

[22] Filed: Nov. 22, 1985

[30] Foreign Application Priority Data

Nov. 30, 1984 [DE] Fed. Rep. of Germany ....... 3443861

[51] Int. Cl.⁴ ............................................. G21C 3/34
[52] U.S. Cl. ................................. 376/442; 376/439; 376/441
[58] Field of Search ................ 376/442, 438, 439, 441

[56] References Cited

U.S. PATENT DOCUMENTS

| | | |
|---|---|---|
| 3,820,226 | 6/1974 | Nakazato . |
| 3,852,154 | 12/1974 | Carlson ............................... 376/442 |
| 3,932,216 | 1/1976 | Jabsen ................................. 376/442 |
| 4,351,795 | 9/1982 | Nicholson .......................... 376/442 |
| 4,388,269 | 6/1983 | Larson ................................ 376/442 |
| 4,578,239 | 3/1986 | Steinke .............................. 376/442 |
| 4,585,615 | 4/1986 | DeMario ............................ 376/442 |

FOREIGN PATENT DOCUMENTS

| | | |
|---|---|---|
| 7728497 | 9/1977 | France . |
| 7902647 | 2/1979 | France . |
| 8122576 | 12/1981 | France . |
| 1153743 | 5/1969 | United Kingdom . |

*Primary Examiner*—Donald P. Walsh
*Attorney, Agent, or Firm*—Herbert L. Lerner; Laurence A. Greenberg

[57] ABSTRACT

In a nuclear reactor fuel element for receiving mutually parallel rods, the improvement includes a rectangular grid-shaped spacer including planar webs crossing and facing the rods defining grid mesh openings receiving the rods, the webs including two outer webs forming an outer corner of the spacer and defining a corner grid mesh opening at the outer corner, the outer corner having an outward curve being curved in a direction parallel to the longitudinal direction of the rods, the outer webs having edges at the curve transverse to the rods being drawn inward toward the rods in the corner grid mesh opening forming a bevel in longitudinal direction of the rod.

3 Claims, 4 Drawing Figures

NUCLEAR REACTOR FUEL ELEMENT

The invention relates to a nuclear reactor fuel element with mutually parallel rods, particularly fuel rods containing nuclear fuel, and a rectangular, grid-shaped spacer with grid mesh openings respectively receiving rods, including outer webs crossing and flatly facing the rods at right angles to the rods, the spacer having an outward curve formed from two outer webs on an outer corner of a corner grid mesh opening located between the two outer webs, being curved in a direction parallel to the longitudinal direction of the rods.

A nuclear reactor fuel elelemnt of this type is known from French Patent of Addition No. 91 358 corresponding to U.S. application Ser. No. 482,792 and British Pat. No. 1,153,743. This conventional nuclear reactor fuel element is particularly intended for a boiling water nuclear reactor. The device includes a so-called duct tube formed of sheet metal which is pushed over the nuclear reactor fuel element with spacers and which rests with two sheet metal cross strips on the inside of the corners of the upper end of the fuel element, on two stay bolts on the top of a grid plate belonging to the fuel element head. The sheet metal cross strips are respectively screwed to the stay bolts with a screw penetrating the corss strips.

The spacers of this nuclear reactor fuel element have outer webs with a width that is reduced at the curves on the outer corners of the grid mesh openings.

When the duct tube is pushed onto the nuclear reactor fuel element, there is a danger that the duct tube will rotate with respect to the nuclear reactor fuel element about the longitudinal axis of the duct tube, as seen in cross section, so that the lower edge of the duct tube rests directly on an outer corner of a corner grid mesh opening of a spacer and becomes caught there. This danger arises particularly when a used duct tube, and therefore one which is somewhat twisted, for example, around its longitudinal axis, is pushed onto the nuclear reactor fuel element.

No duct tubes are associated with nuclear reactor fuel elements which are intended for a pressurized water nuclear reactor, but in the reactor core of such a pressurized water nuclear reactor there are a series of similarly constructed nuclear reactor fuel elements with parallel longitudinal axes, disposed like chess board squares closely adjacent each other. Therefore, when loading or unloading a pressurized water nuclear reactor with the individual nuclear reactor fuel elements, nuclear reactor fuel elements, especially those diagonally adjacent each other in the reactor core, can still become caught at the outer corners of the corner grid mesh openings of their spacers when the spacers are constructed as in the conventional nuclear reactor fuel elements intended for boiling water nuclear reactors. This type of hooking of diagonally adjacent nuclear reactor fuel elements can lead to a destruction of the outer webs of the spacers of these nuclear reactor fuel elements, so that these nuclear reactor fuel elements cannot be re-inserted into the reactor core of the pressurized water nuclear reactor. Nuclear reactor fuel elements which have become greatly warped in the reactor core due to operational stresses have a particular tendency to become caught.

It is accordingly an object of the invention to provide a nuclear reactor fuel element which overcomes the hereinafore-mentioned disadvantages of the heretofore-known devices of this general type, to avoid using spacers when duct tubes are pushed onto nuclear reactor fuel elements and to avoid the hooking of spacers to spacers of adjacent nuclear reactor fuel elements when nuclear reactor fuel elements are inserted into reactor cores.

With the foregoing and other objects in view there is provided, in accordance with the invention, a nuclear reactor fuel element for receiving mutually parallel rods especially fuel rods containing nuclear fuel, comprising a rectangular grid-shaped or latticed spacer including planar webs crossing and facing the rods at right angles defining grid mesh openings receiving the rods, the webs including two outer webs forming an outer corner of the spacer and defining a corner grid mesh opening at the outer corner, the outer corner having an outward curve being curved around a direction parallel to the longitudinal direction of the rods, the outer webs having edges at the curve transverse to the rods being drawn inward toward the rods in the corner grid mesh opening forming a bevel in longitudinal direction of the rod.

The edges of the two outer webs drawn in toward the rod ensure a hooking-free sliding of both a duct tube and a spacer of an adjacent nuclear reactor fuel element in a reactor core.

In accordance with another feature of the invention, the edges of the outer webs form edges of a channel on the curve. This channel can ensure coolant flow on the outside of the rod passing through the corner grid mesh opening of the spacer, which is not obstructed by the spacer.

In accordance with a concomitant feature of the invention, the two outer webs together include a one-piece angular part forming the curve and a remaining part of each outer web secured to the angular part at locations spaced from the curve. Thus it is possible to avoid fastening points of the two outer webs with overlapping on the curve which encourages hooking.

Other features which are considered as characteristic for the invention are set forth in the appended claims.

Although the invention is illustrated and described herein as embodied in a nuclear reactor fuel element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompaying drawings, in which.

Figures 1, 2, 3, 4:
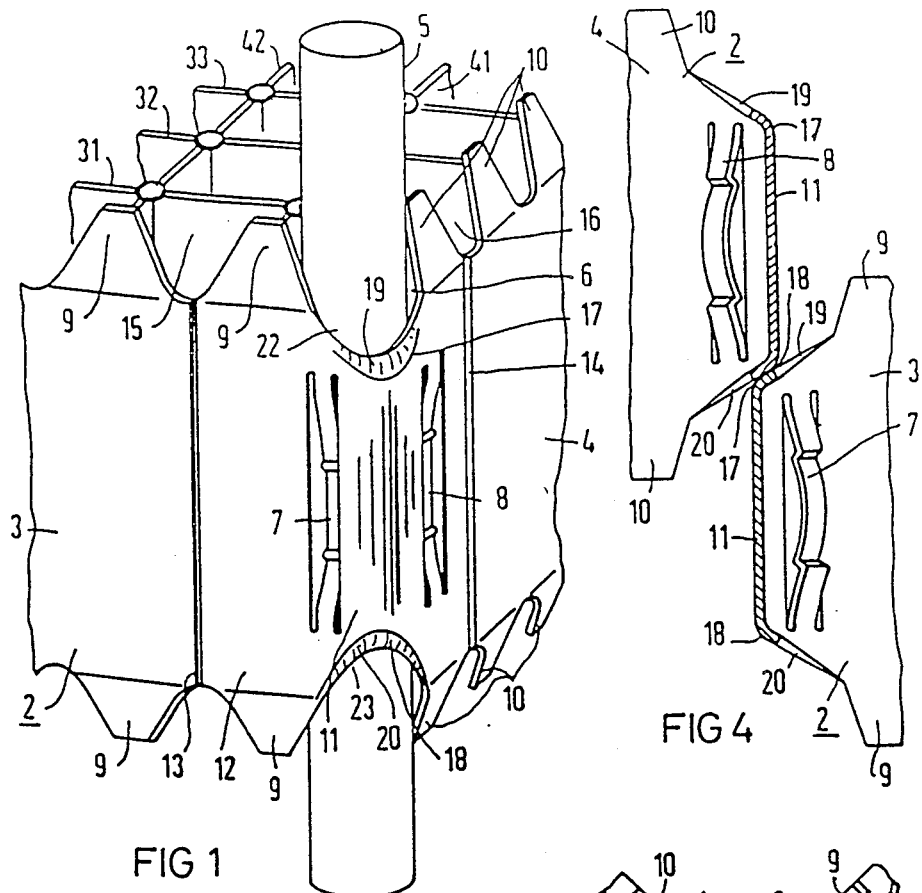
FIG. 1 is a fragmentary, diagrammatic, perspective view of a section of a spacer in a nuclear reactor fuel element of the invention.
FIG. 2 is a fragmentary plan view of the spacer of FIG. 1.
FIG. 3 is a fragmentary plan view of the corner meshes of spacers of two nuclear reactor fuel elements of the invention according to FIGS. 1 and 2.
FIG. 4 is a fragmentary, longitudinal-sectional view taken along the dot-dash line IV—IV of FIG. 3, in the direction of the arrows.

Referring now to the figures of the drawings in detail and first, particularly, to FIGS. 1 and 2 thereof, there is seen a square grid-shaped or latticed spacer 2 formed of a nickel-chronium-iron-alloy which belongs to a nuclear reactor fuel element for a pressurized water nuclear reactor. Two flat, planar outer webs 3 and 4 can be seen which are disposed edgewise at right angles to each other. Disposed on the inside of these outer webs 3 and 4 are inner webs 31 to 33 parallel to the outer web 3, and inner webs 41 and 42 parallel to the outer web 4, which cross each other at right angles forming square grid meshes or mesh openings. A control rod guide tube or a fuel rod of the nuclear reactor fuel element containing nuclear fuel, is engaged in a respective opening. The inner and outer webs are at right angles to the control rod guide tube or fuel rod and both the outer webs 3 and 4 and the inner webs 31 to 33 and 41 and 42 flatly face the control rod guide tube or fuel rod. For the sake of clarity, only one single fuel rod 5 is shown in the corner grid mesh opening 6 of the spacer 2 located between the two outer webs 3 and 4. The lateral surfaces of the edgewise inner and outer webs are parallel to the longitudinal direction of the fuel rod 5. The control rod guide tubes penetrating the other grid mesh openings of the spacer 2 and the fuel rods containing the nuclear fuel, are parallel to the fuel rod 5. Each of the control rod guide tubes is detachably connected at one end thereof to a non-illustrated cover plate of a cover part, e.g. with a screw connection, and is connected at the other end thereof to a non-illustrated base plate of a base part of the nuclear reactor fuel element. The control guide rod tubes penetrate the cover and base parts at right angles. The cover and base plates are also square. The fuel rods which engage a respective one of the grid mesh openings of the spacer 2 and which contain nuclear fuel in gas-tightly sealed cladding tubes formed of a zirconium alloy, are secured neither to the cover plate nor to the base plate of the nuclear reactor fuel element, but instead they have clearance in the longitudinal direction between the cover and the base plates and they can therefore freely expand along the direction of their longitudinal axes, i.e. in the longitudinal direction of the fuel element. Inside the square grid mesh openings, the inner webs 31 to 33 and 41 and 42 of the spacer 2 have non-illustrated springs and fixed knobs which are respectively directed inwardly into the grid mesh openings through which the fuel rods are guided. These springs and knobs support these fuel rods in a force-locking manner on the latticed spacer 2. The latticed spacer 2 is in turn supported in a form-locking manner on control rod guide tubes guided through individual grid mesh openings. A form-locking connection is one which is accomplished by the shape of the parts themselves, while a force-locking connection requires outside force. On the outer webs 3 and 4 there can be seen a spring 7, 8 directed into the corner grid mesh 6 of the spacer, which supports the fuel rod 5 on the spacer 2 in a force-locking manner. On the edges that are at right angles to the mutually parallel control rod guide tubes and fuel rods in the spacer 2, the outer webs 3 and 4 have deflector or guard vanes 9 and 10 that are curved slightly inward.

The spacer 2 has an outwardly curved quarter circle curve 11 on the outer corner of the corner grid mesh opening 6 located between the outer webs 3 and 4. The curve 11 is formed from these two outer webs 3 and 4 with an overall equal radius of curvature curved around the same directional axis which is parallel to the longitudinal direction of the control rod guide tubes and the fuel rods in the spacer 2.

The two outer webs 3 and 4 form the curve 11 with a one-piece angular part 12 which is secured at a location 13 or 14 to an elongated remaining part of each of the two outer webs 3 and 4. These locations 13 and 14 are located on outer grid mesh openings 15 and 16 adjacent the corner grid mesh opening 6 and are therefore spaced from the curve 11. The locations 13 and 14 are oblong and parallel to the longitudinal direction of the control rod guide tubes and the fuel rods in the spacer 2. At these locations 13 and 14 the angular part 12 overlaps the extended remaining parts belonging to the outer webs 3 or 4. The angular part 12 is welded to the remaining parts at the locations 13 and 14.

The edges of the outer webs 3 and 4 which are at right angles to the longitudinal direction of the control rod guide tubes 5 and the fuel rods in the spacer 2 change over at the curve 11 into edges 17 and 18 defining channels, chamfers or niches 22 and 23. At these edges 17 and 18 of the channels 22 and 23 and at the curve 11, the outer webs 3 and 4 or the angular part 12 of these outer webs 3 and 4 are drawn inward toward the fuel rod 5 penetrating the corner grid mesh opening 6 and therefore form respective bevels 19 and 20 at these edges 17 and 18. The bevels 19 and 20 run in the longitudinal direction of the fuel rod 5 toward the end of the fuel rod 5 which is located on the side of the cross section of the spacer on which the edges 17 and 18 with the bevels 19 and 20 are also located.

The spacers 2 of two mutually parallel nuclear reactor fuel elements are disposed diagonally next to each other in a reactor core like chess board squares. Before a relative movement of the nuclear reactor fuel elements in their longitudinal direction, curves 11 on the outside of the fuel rod 5 of the respective diagonally adjacent nuclear reactor fuel elements initially lie against each other. During the course of this relative movement, the two spacers 2 of the adjacent nuclear reactor fuel elements meet, and the bevel 20 of the spacer 2 of one nuclear reactor fuel element can slide on the bevel 19 of the spacer 2 of the other nuclear reactor fuel element without catching against edges of the outer webs of the spacers 2, until finally the curves 11 of the spacers 2 of the two nuclear reactor fuel elements lie next to each other and touch, as shown in FIGS. 3 and 4.

By means of the bevels 19 and 20 of the spacer 2 according to FIGS. 1 to 4, not only is hooking of adjacent nuclear reactor fuel elements prevented during loading of a pressurized water nuclear reactor, but the outer corner of the corner grid mesh opening 6 located between the outer webs 3 and 4 is also stiffened, reinforced or strengthened.

The foregoing is a description corresponding in substance to German application No. P 34 43 861.0, dated Nov. 30, 1984, the International priority of which is being claimed for the instant application and which is hereby made part of this application. Any material discrepancies between the foregoing specification and the aforementioned corresponding German application are to be resolved in favor of the latter.

We claim:

1. In a nuclear reactor fuel element for receiving mutually parallel rods, the improvement comprising a rectangular grid-shaped spacer including planar webs crossing and facing the rods defining grid mesh openings receiving the rods, said webs including two outer webs forming an outer corner of said spacer and defining a corner grid mesh opening at said outer corner, said outer corner having an outward curve being curved around a direction parallel to the longitudinal direction of the rods, said outer webs having edges at said curve transverse to the rods being drawn inward toward the rods in the corner grid mesh opening forming a bevel in longitudinal direction of the rod, and said edges of said outer webs forming edges of a channel on said curve.

2. Nuclear reactor fuel element according to claim 1, wherein said two outer webs together include a one-piece angular part forming the curve and a remaining part of each outer web secured to said angular part at locations spaced from said curve.

3. Nuclear reactor fuel element according to claim 1, wherein said spacer has a given vertical height at said outer corner, and said outward curve covers said entire given vertical height.

* * * * *